Nov. 15, 1932.  J. H. PETERSON  1,888,093

HYDRAULIC BRAKE

Filed June 29, 1931

Inventor
J. H. Peterson
By Arthur H. Sturges
Attorney

Patented Nov. 15, 1932

1,888,093

UNITED STATES PATENT OFFICE

JOHN H. PETERSON, OF SILVER CITY, IOWA

HYDRAULIC BRAKE

Application filed June 29, 1931. Serial No. 547,735.

The present invention relates to brake mechanism, particularly as applied to motor vehicles and has particular reference to a brake of the hydraulic type.

At the present time hydraulic brakes are provided at each drum with a pair of oppositely directed cylinders and pistons, and it is an object of the present invention to provide a construction wherein but a single cylinder and piston may be used, and wherein a toggle joint or connection is provided between the piston and the adjacent brake shoes to be expanded.

The invention also aims at the provision of a single cylinder and piston brake construction which may be economically and easily applied to the brake drum mechanism and shoes now in use so that special construction of the general parts of an automobile brake need not be resorted to for the application and use of this invention.

The invention also provides an improved means of adjusting the opposite or free ends of the brake shoes so as to effect substantially an even expansion and pressure of the brake shoes throughout their lengths, and to admit of the proper equalization of the pressure of the shoes against the brake drum.

With the foregoing and other objects in view, the invention will be more fully described hereinafter, and will be more particularly pointed out in the claims appended hereto.

In the drawing, wherein like symbols refer to like or corresponding parts throughout the several views.

Figure 1:
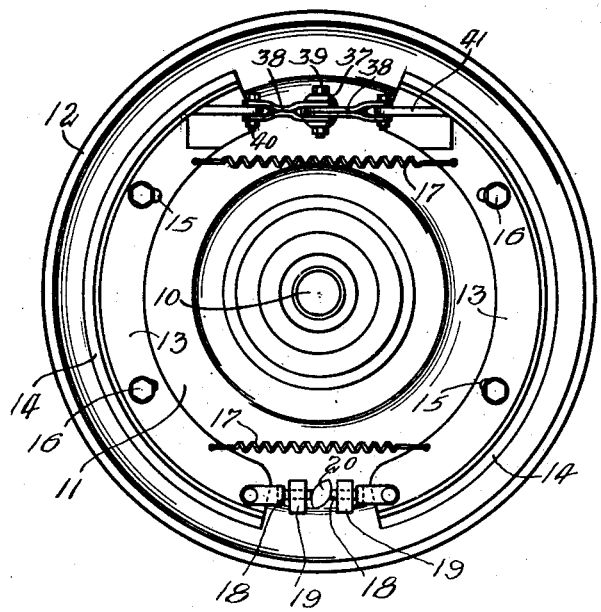
Figure 1 is an outside elevation of a brake showing the improvements of the present invention applied thereto.

Referring to the drawing, 10 designates a wheel spindle upon which a vehicle wheel of any type may be mounted. The inner end of the spindle 10 is provided with a backing plate 11 and a brake drum closing flange 12 which projects outwardly toward the spindle 10. A pair of brake shoes 13, provided with the usual brake lining 14, is mounted on the backing plate 11 and is adapted to bear against the inner face of the drum, not shown. The brake shoes 13 are provided with elongated slots 15 through which project supporting and guiding bolts 16, or the like, which project outwardly from the plate 11 and which serve to guide the shoes 13 for uniform movement toward and from the surface of the drum. The brake shoes 13 are maintained normally retracted by springs 17 which are secured across the upper and lower portions of the shoes 13. The lower or free ends of the shoes 13 are each provided with a pivotally mounted arm 18, the arms 18 extend axially toward each other and are slidably supported in bearing eyes 19 projecting from the outer face of the plate 11. The plate 11 carries an abutment cam 20 which lies between the inner adjacent ends of the arms 18 and which is adapted for adjustment about its axis in any suitable manner for spacing the arms 18 apart to the desired extent for taking up wear between the brake shoes and the drum.

Figure 2:
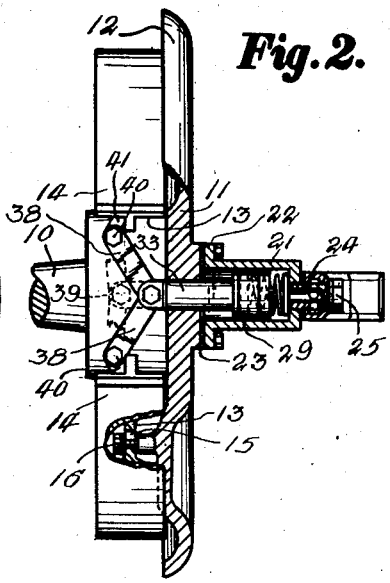
Figure 2 is a top plan view of the same, partly in section disclosing the single cylinder and piston construction of this invention.
Figure 3:
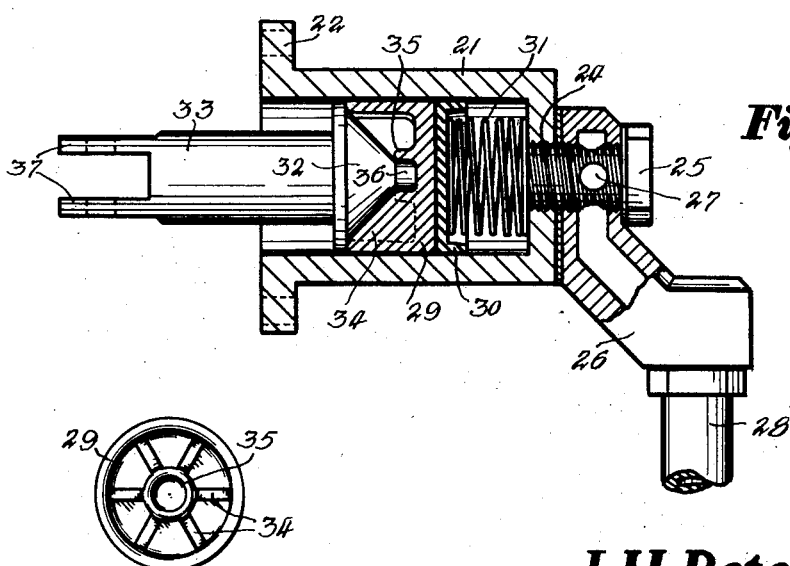
Figure 3 is a detail enlarged section taken longitudinally through the piston and cylinder construction of this invention.
Figure 4:
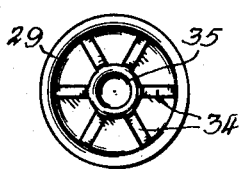
Figure 4 is a detail outer end view of the piston head employed.

The single cylinder construction of this invention is shown in detail in Figure 3, and comprises a cylinder 21 open at one end and having an attaching flange 22 at said end adapted to abut against the inner or rear side of the plate 11 near the top thereof, as shown in Figure 2. Machine screws 22, or the like, are used for clamping the flange 22 in position, and a packing gasket 23 may be interposed between the flange 22 and the plate 11 for sealing the cylinder 21 against the plate.

The opposite or closed end of the cylinder 21 is provided with a threaded aperture therethrough disposed in axial line with the cylinder and through which is threaded a hollow binding screw 24 having at its outer end a cap or head 25 for binding a hollow angle coupling 26 against the inner end of the cylinder 21. The coupling 26 may be of relatively flat construction at its upper end adapted to bear against the cylinder 21 and is provided with a threaded opening through its upper end portion and through which the binding screw 24 passes. The screw 24 is provided with one or more lateral openings 27 therethrough for intercommunicating the coupling 26 with the interior of the screw 24, the latter opening into the cylinder 21. The coupling 26 is attached to a flexible hose or pipe 28 which is connected in the usual hydraulic system for supplying the necessary pressure to the cylinder 21. Within the cylinder 21 is disposed a piston head 29 having a flat inner face against which is seated a leather or rubber sealing cup 30, and the latter is held against the piston by an expansion spring 31 which is disposed in the closed end of the cylinder 21. The spring 31 maintains the piston steady in the cylinder.

The piston 29 with its cup 30 slides freely in the cylinder 21, and the piston 29 is recessed in its outer side to accommodate a conical head 32 mounted on the adjacent end of a piston rod 33 which projects from the piston through the open end of the cylinder 21 and through a suitable opening or bearing provided in the plate 11. The piston 29 is reinforced by a plurality of radial bevelled ribs 34 which approach the conical surface of the head 32 so that the head 32 may remain in interfitting engagement with the piston 29 and at the same time compensate for various slight inequalities in the line of thrust. The axial portion of the piston 29 has a socket 35 within which movably fits a projection 36 at the apex of the head 32 for interconnecting the piston rod 33 to the piston 29. The outer marginal or base portion of the head 32 is of cylindrical contour for loosely fitting within the cylinder 21.

The piston rod 33 is relatively short and is provided at its outer end with spaced apart forked arms 37 receiving therebetween the adjacent interfitting ends of a pair of links 38 which diverge outwardly from the piston rod 33 and approach the upper ends of the brake shoes 13. A pivot pin or bolt 39 pivotally connects the inner ends of the links 38 to the outer end of the piston rod 33.

The links 38 are forked at their outer ends and are pivotally connected by bolts 40, or the like, to bracket lugs 41 which are secured, integrally or otherwise, to the upper ends of the brake shoes 13.

In operation, pressure supplied through the pipe 28 is transmitted through the coupling 26, the hollow screw 24 and into the closed end of the cylinder 21 against the piston. The piston is urged outwardly in the cylinder 21 and moves the piston rod 33 outwardly so as to expand the toggle links 38 with the result that the upper ends of the brake shoes 13 are spread with considerable force.

The cam 20 at the lower ends of the brake shoes is adjusted so as to maintain the upper and lower portions of the brake shoes in uniformly spaced relation with respect to the brake drum. This expansion of the brake shoes effects the application of the brake, and when the source of pressure is relieved in the pipe 28, the springs 17 retract the brake shoes and force the piston rod 33 with its piston backwardly in the cylinder against the tension of the spring 31 so that the shoes 13 are returned to normal releasing position.

It will be noted that the brake shoes are thus uniformly actuated and that the pressure is equalized through the links 38 and from a single cylinder 21 and a single piston 29 therein.

The cylinder 21 may be of any desired size, and it is evident that the action is a quick and easy one and the brake does not depend upon the divided pressure usually required in present known brake constructions of this type.

I do not wish to be restricted to the size, form, and proportions of the various parts, and obviously changes could be made in the construction herein described without departing from the spirit of the invention, it being only necessary that such changes fall within the scope of the appended claims.

What is claimed is:

1. A motor for hydraulic brake mechanism, comprising a cylinder open at one end and having an attaching flange thereat, a piston in the cylinder having a hollow outer end with spaced radial ribs therein flaring outwardly in conical form and having an axial socket at the inner ends of the ribs, a piston rod having a conical head on its inner end adapted to seat against said ribs of the piston and provided at its inner extremity with an axial projection movably fitted in said socket of the piston, and a hollow coupling communicating with the closed end of the cylinder and adapted for attachment to a pressure supply pipe for admitting pressure to the inner end of the cylinder to advance the piston toward the open end thereof.

2. A motor for hydraulic brake mechanism, comprising a cylinder open at one end and having a reduced threaded opening through its inner end, a piston in the cylinder, a piston rod connected to the piston and extending through the open end of the cylinder, a hollow angular coupling fitted against the inner end of the cylinder and having a threaded opening therethrough adapted to align with the threaded opening in the cylinder, said coupling adapted for connection with a source of pressure supply, and a hollow connecting screw threaded through the coupling and the inner end of the cylinder and having lateral openings communicating with the coupling for supplying pressure therethrough to the inner end of the cylinder.

3. A motor for hydraulic brake mechanism, comprising a cylinder open at one end and having attaching means thereat, a piston in the cylinder, a piston rod connected to the piston and projecting through the open end of the cylinder, an angular hollow coupling having a flat end for engagement against the inner end of the cylinder and having an angled end adapted for communication with a source of pressure supply, said piston rod adapted to be normally urged inwardly of the cylinder, a spring disposed between the inner end of the cylinder and said piston for steadying the latter, and a hollow connecting screw threaded through said flat portion of the hollow coupling and engaging through the inner wall of the cylinder, said hollow screw having lateral openings in register with the interior of the coupling member for supplying pressure therethrough to the inner end of the cylinder, said screw having an exterior enlarged head upon its outer end adapted to engage the coupling member for binding the latter against the upper end of the cylinder.

In testimony whereof, I have affixed my signature.

JOHN H. PETERSON.